US006234422B1

United States Patent
Bolonkin (10) Patent No.: US 6,234,422 B1
(45) Date of Patent: May 22, 2001

(54) UNIBLADE AIR ROTOR AND FLIGHT AND COVERCRAFT VEHICLES WITH ITS

(76) Inventor: Alexander A. Bolonkin, 3400 W. 15th St., #42, Rosamond, CA (US) 93560

( * ) Notice: Subject to any disclaimer, the term of this patent is extended or adjusted under 35 U.S.C. 154(b) by 0 days.

(21) Appl. No.: 09/203,130

(22) Filed: Dec. 1, 1998

(51) Int. Cl.$^7$ ................................................. B64C 27/06
(52) U.S. Cl. .......................... 244/6; 244/7 R; 244/17.11; 416/19; 416/24
(58) Field of Search ................................. 249/6, 7 R, 7 A, 249/17.11, 17.13; 411/19, 24; 244/46, 49

(56) References Cited

U.S. PATENT DOCUMENTS

| | | | | |
|---|---|---|---|---|
| 2,173,291 | * | 9/1939 | Ash ......................................... | 416/19 |
| 2,297,815 | * | 10/1942 | Tidd ........................................ | 416/19 |
| 2,418,274 | * | 4/1947 | Nemeth ................................... | 416/24 |
| 2,471,687 | * | 5/1949 | Holmes ................................... | 416/19 |
| 2,742,095 | * | 4/1956 | Pitcairn .................................. | 416/19 |
| 3,074,487 | * | 1/1963 | Dershmidt .............................. | 416/19 |
| 3,166,129 | * | 1/1965 | Bryan ..................................... | 416/24 |
| 3,490,720 | * | 1/1970 | Girard .................................... | 244/7 A |
| 3,693,910 | * | 9/1972 | Aldi ....................................... | 244/7 A |
| 4,528,564 | * | 7/1985 | Trampnau ........................... | 244/17.11 |
| 4,793,572 | * | 12/1988 | Mecca ................................... | 244/7 A |
| 4,874,291 | * | 10/1989 | Roberts et al. ......................... | 416/19 |

* cited by examiner

Primary Examiner—Galen L. Barefoot (57) ABSTRACT

The invention is related to air flight vehicles, such as vertical take-off and landing (VTOL) airplanes, helicopters and covercraft.

The goal of this invention is to create an air rotor designed so that while after vertical take off or cover regime, one can be stopped, fixed in a specific position and hidden into the fuselage (gondola) thus eliminating of air resistance when the rotor is not in working state. On landing this rotor can be extended out, brought into rotation and used for creation of lift force and vertical landing.

The indicated goal is achieved by means of the rotor made as single blade (uniblade). The author solved the problem of force and moment balance of single blade. The center of gravity of the counterweight is located below the horizontal plane, and the blade has the horizontal sway axle, that crosses the vertical rotor rotation axis. The author offer this rotor on single axis, on co-axis, and on different exiles.

This uniblade rotor is designed to subsonic and supersonic VTOL airplanes, for helicopter cars, flight motorcycles, hoppycopters, and covercraft.

The uniblades be used also as a veritable sweep wing (for supsonic and supersonic aircraft).

11 Claims, 14 Drawing Sheets

UNIBLADE AIR ROTOR AND FLIGHT AND COVERCRAFT VEHICLES WITH ITS

GROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to air flight vehicles, such as apparatus of vertical take off and landing (VTOL), helicopters, covercraft, flighting automobiles, motorcycles, and traditional airplanes.

2. Description of the Related Art.

Figure 1A:
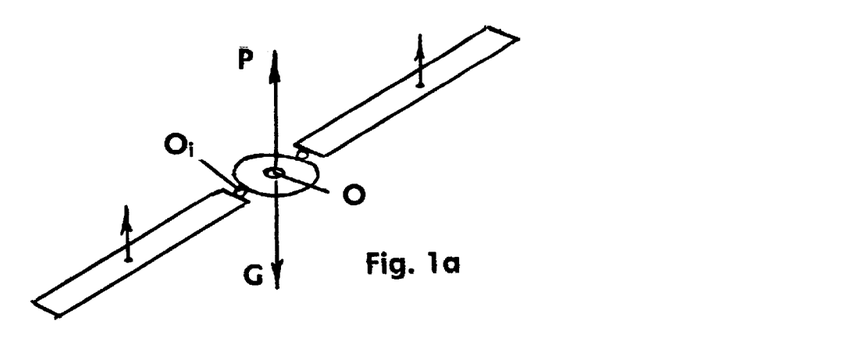
FIG. 1. Existing 2- and 6 blade rotors, blade swing axis O and balancing scheme of lifting force $P=\Sigma P_i$.
Figure 1B:
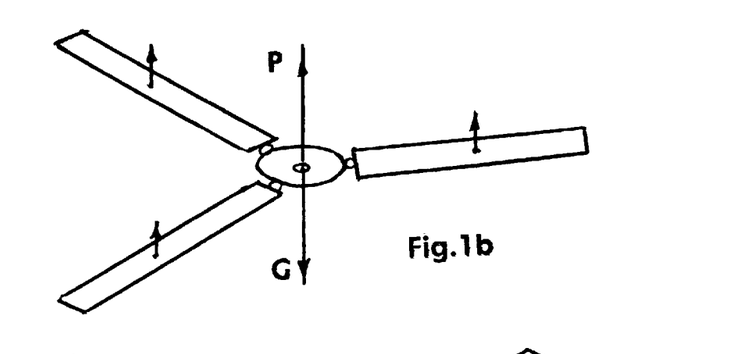
Figure 1C:
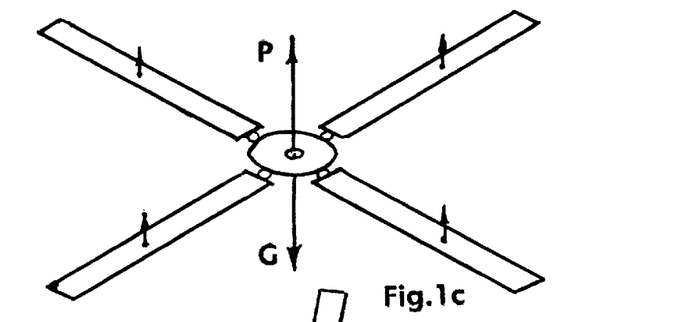
Figure 1D:
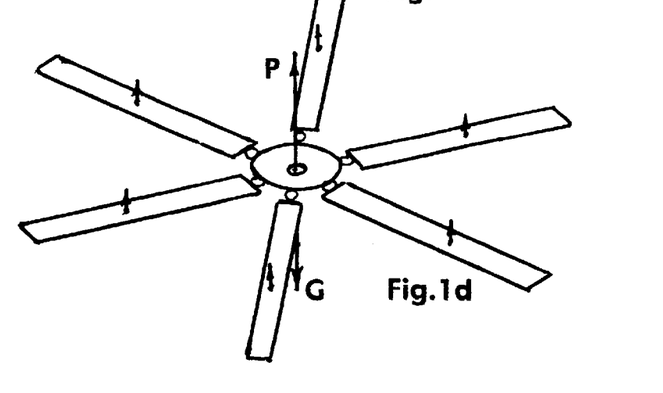
Figure 1E:
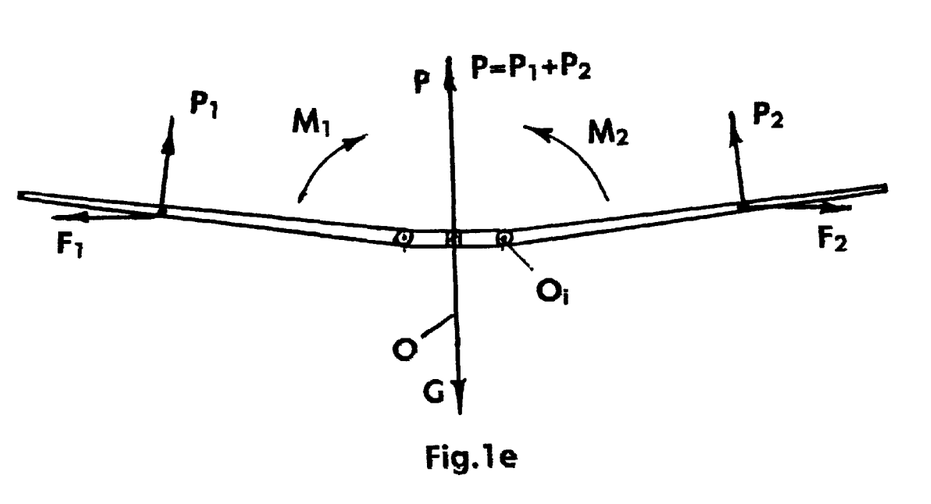

Known in art are helicopter rotors having 2, 3, 4, 6 and more blades (Jane's Aircraft Directory, 1995–1996), (FIG. 1a–d). Requirement of 2 or more blades is dictated by the blades aerodynamic force and weight balance. Total resultant lift force of blades thrust must act along blade axis O (FIG. 1) and blades' centrifugal force must be balanced, while the blade horizontal axis $O_i$ is located close to vertical axis O, but $O_i$ and O do not cross each other (FIG. 1e).

BRIEF SUMMARY OF THE INVENTION

The goal of this invention is to create an air rotor designed so that while in flight, it can be stopped, fixed in a specific position and hidden into the fuselage (gondola0 thus eliminating air drag when the rotor is not in working state.

On lending this rotor can be extended out, brought into rotation and used for creation of lift force and vertical landing.

Figure 2A:
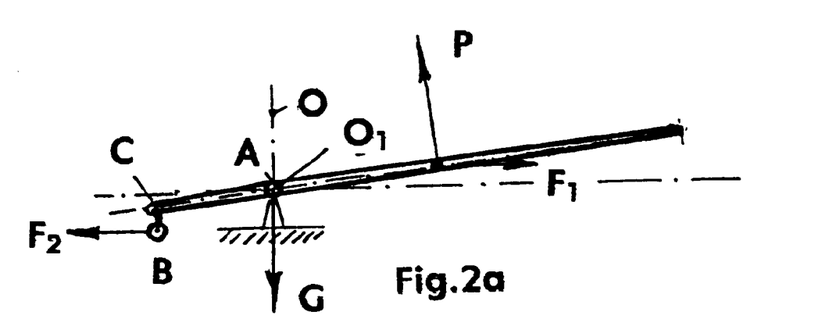
FIG. 2. Uniblade rotor and arising problems of unbalanced lifting and centrifugal forces. P is blade's lifting force. Q is circular trajectory along which lifting force P moves. B is counterbalance. $F_1$, $F_2$ are centrifugal forces of the blade and counterbalance correspondingly. CB is shift distance of the counterbalance center of gravity down from the blade plane. $O_1$ is rotor axis. O is blade swing axle.
Figure 2B:
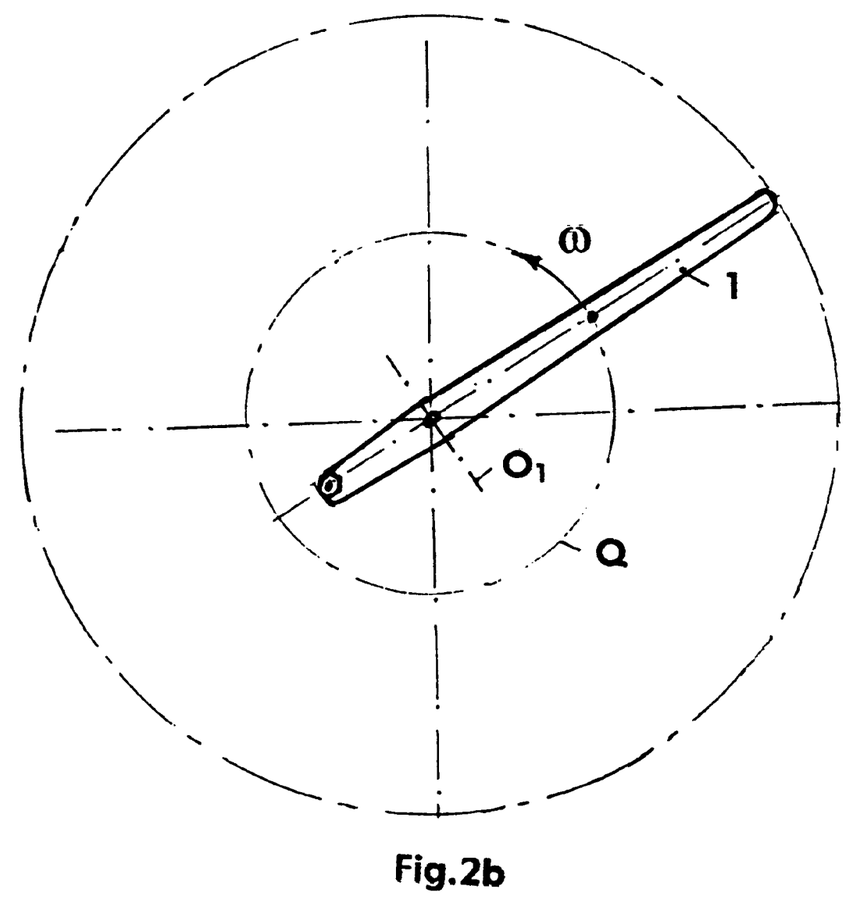

The indicated goal is achieved by means of the rotor made as single blade (uniblade). The center of gravity of the counter weight B (FIG. 2) is located below the horizontal blade plane, and blade has the horizontal sway axis $O_1$ that crosses the vertical rotor's rotation axis O (FIG. 2a).

Uniblade rotor has huge advantages when compared to a helicopter rotor with 2,3 of more blades. The uniblade rotor can be stopped (in direction of air stream) and moved in to the fuselage (gondola). In hidden position, the uniblade rotor does not interfere with the air flow whereby the air vehicle can reach designed speed, even supersonic speed. On landing, the uniblade rotor is easy to move out of the fuselage, bring into rotation and make landing in helicopter mode.

However, the uniblade rotor posses a problem of the blade balancing. The most important of which is that large unbalanced blade lifting force P rotates along circumference Q together with the blade at angular speed ω (FIG. 2b) and creates large capsizing moment, direction of which also changes (rotates).

In order to eliminate these negative effects, the inventor proposes to place the blade counterbalance B. The counter balance gravity center is shifted down (distance CB in FIG. 2a) from the blade plane, and for elimination of the capsizing moment, the axis of horizontal swing O of the blade is located so that it crosses rotation axis O of the engine power drive.

BRIEF DESCRIPTION OF THE SEVERAL VIEWS OF THE DRAWINGS

FIG. 3. Diagram of balancing of the blade lifting force P, capsizing moment M and centrifugal force $F_1$. The balance is attained due to shifting the counterbalance down and placing swing axle O at the rotor rotation axle, FIG. 4a. Co-axle uniblade rotor. KL is meeting line of synchronously rotating blades. Line KL is positioned in the direction of flight. Angular speeds of the blades are equal to each other., i.e. $\omega_1=\omega_2$. Such meeting line KL provides small distance between the uniblades.

b) Supersonic helicopter—airplane with retracted single blade propeller.

b) Airplane with retracted rotor.

d) Airplane with retracted uniblade.

b) Airplane in flight.

b) Airplane in flight.

a) 1—uniblade, 2—hinge, 3—lock, 4—hinge of blade swing exile, 5—main exile, 6—counterbalance.

b) Uniblade in folding (variant 1).

c) Uniblade in folding (variant 2).

DETAILED DESCRIPTION OF THE INVENTION

As shown in FIG. 2, uniblade rotor comprises blade 1, counterbalance B, horizontal axle of blade swing O situated in the blade plane and crossing vertical drive axle O. Counterbalance B is shifted down at distance CB from the blade plane. This distance CB could go to zero in limit in presence of axle O.

The uniblade rotor work as follows. Lift force P (FIG. 2) created by a rotating blade, causes moment M (FIG. 3) that tends to rotate the blade counter-clockwise. Counterbalance centrifugal force F (FIG. 2a), due to the counterbalance shifted down, also creates counterweight moment M (FIG. 3) with direction opposite to moment M (FIG. 3).

Figure 3:
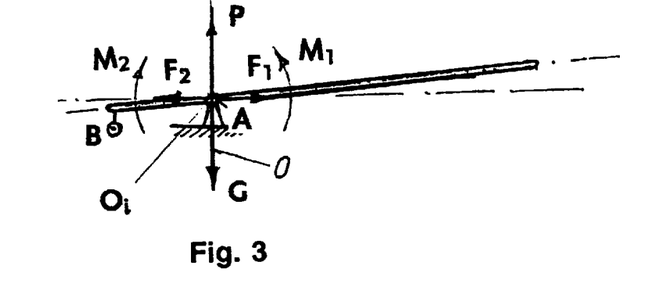

Resultant lift force P acts along drive rotation axle ) and balances flight vehicle weight G (FIG. 3). The blade and counterbalance centrifugal forces $F_1$ and $F_2$ are also balanced, $F_1=F_2$.

Figure 4A:
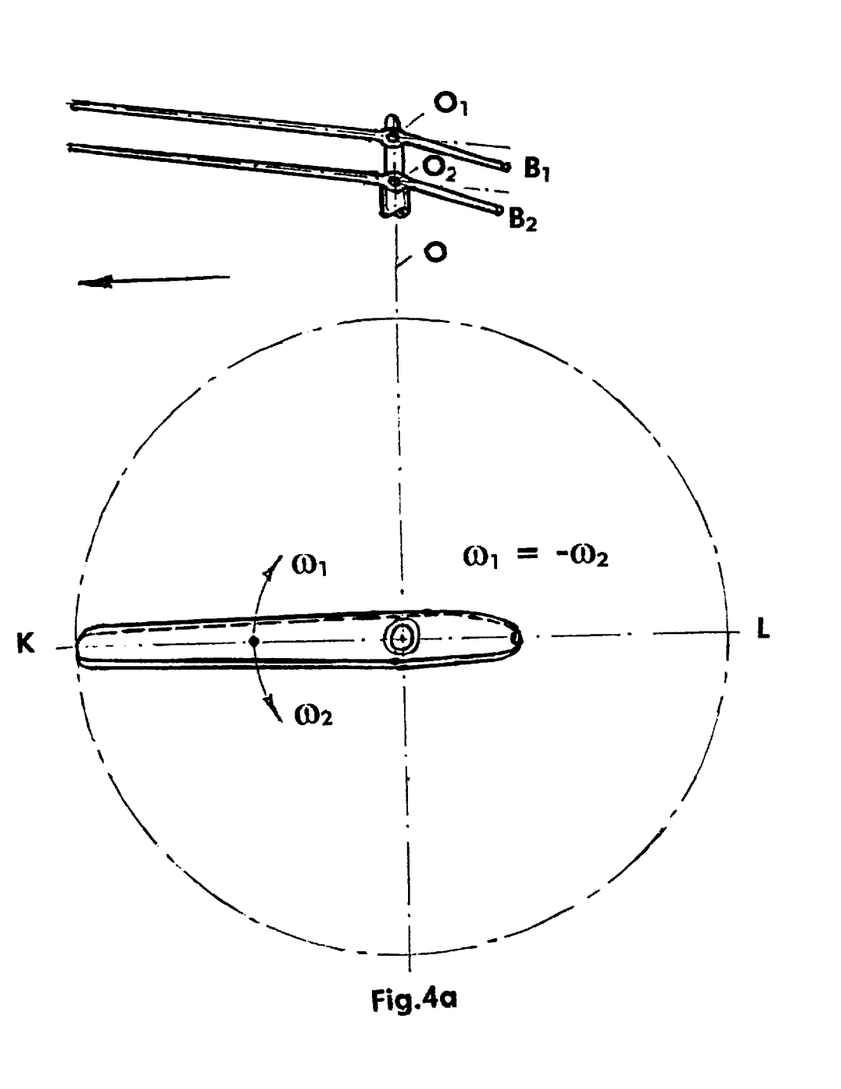

Co-axial uniblade rotors rotate synchronously and meet on line KL of movement direction of the flight vehicle (FIG. 4). In this position the blades are parallel to each other which makes it possible to keep distance between the blades (unirotors) small, actually much smaller than in traditional co-axial multiblade helicopter propellers. This results in uniblade having significantly simpler design and increased rotor efficiency.

Figure 4B:
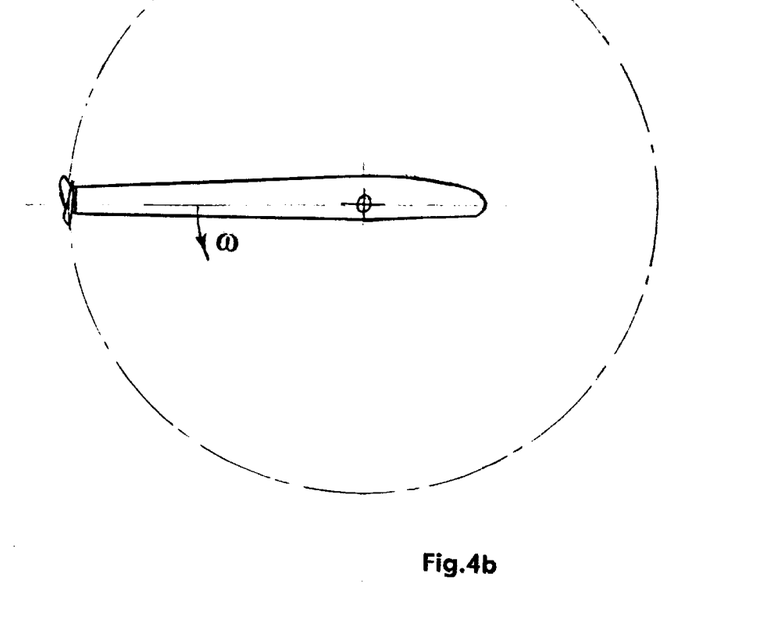
FIG. 4b. Uniblade rotor with turning blade at the end of main blade. That may be used for covercraft—helicopter which used ground effect. 1 —main uniblade, 2 —turning blade at end of the main blade, 3 —counterbalance, 4 —hinge of the blade swing axle, 5 —axis of the turning blade, 6 —sensor of distance from blade to barrier (for example, ultrasonic sensor), 7 —ground, 8 —direction of turn of additional blade, 9 —trajectory of the end of additional blade, 10 —trajectory of main blade, 11 —hinge.
Figure 14:
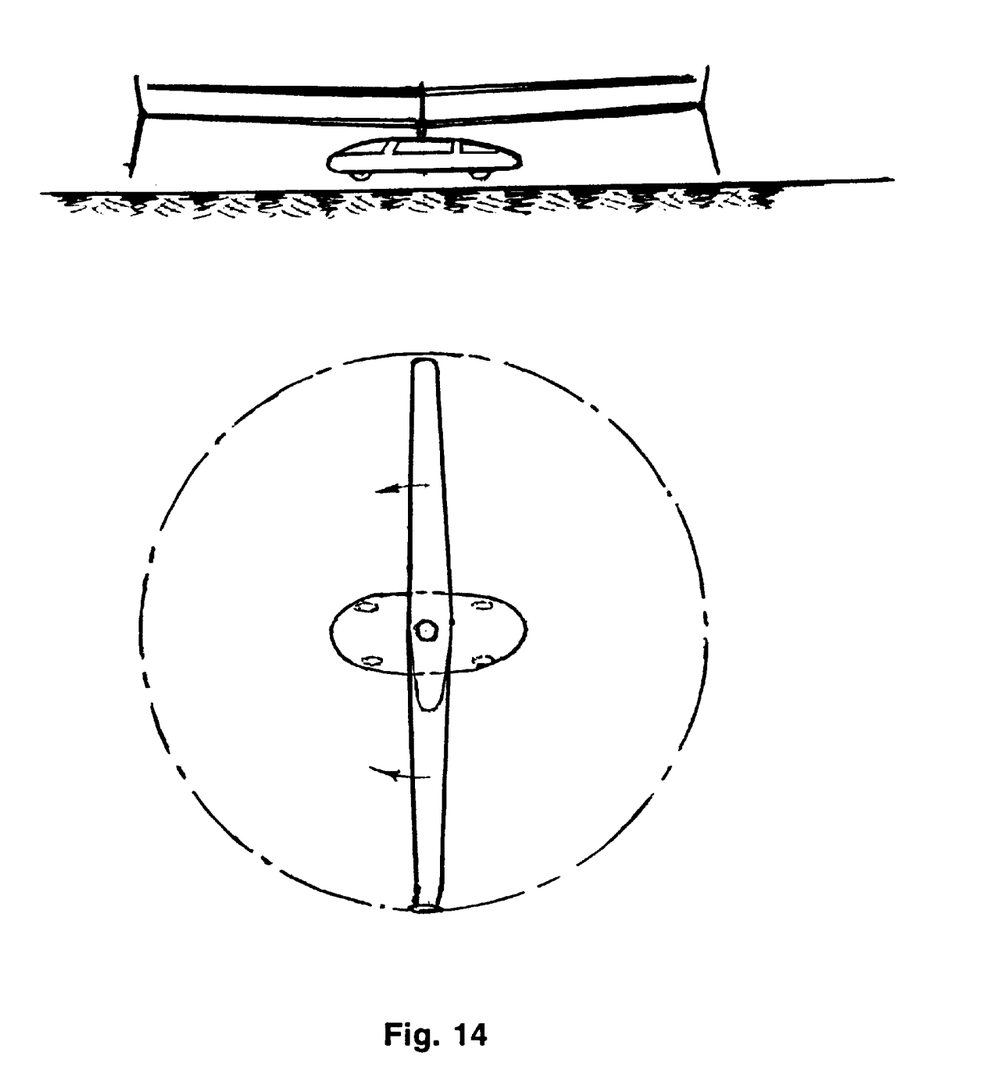
FIG. 14. The covercraft—helicopter with co-axile uniblade rotor which has the turning blade at the end of the main blade.

The main blade can has the additional small blade at the end (FIG. 4b). That may be turning or interning. This end blade increase the rotor efficiency and trust about ground. The trust and ratio of fuel depend strong from distance, which is from the end of additional blade to ground. The trust may increase in 2–6 times. It is important for covercraft-helicopter (FIG. 14). In regime of cover this vehicle can move over marsh, river, sand. And in regime of helicopter one can flight over forest, precipice, mountains and so on.

The end blade has a sensor of distance from end of additional blade to ground, for example, ultrasonic sensor. The additional blade can rotate and follow to profile of ground surface (see FIG. 4b).

Figure 15:
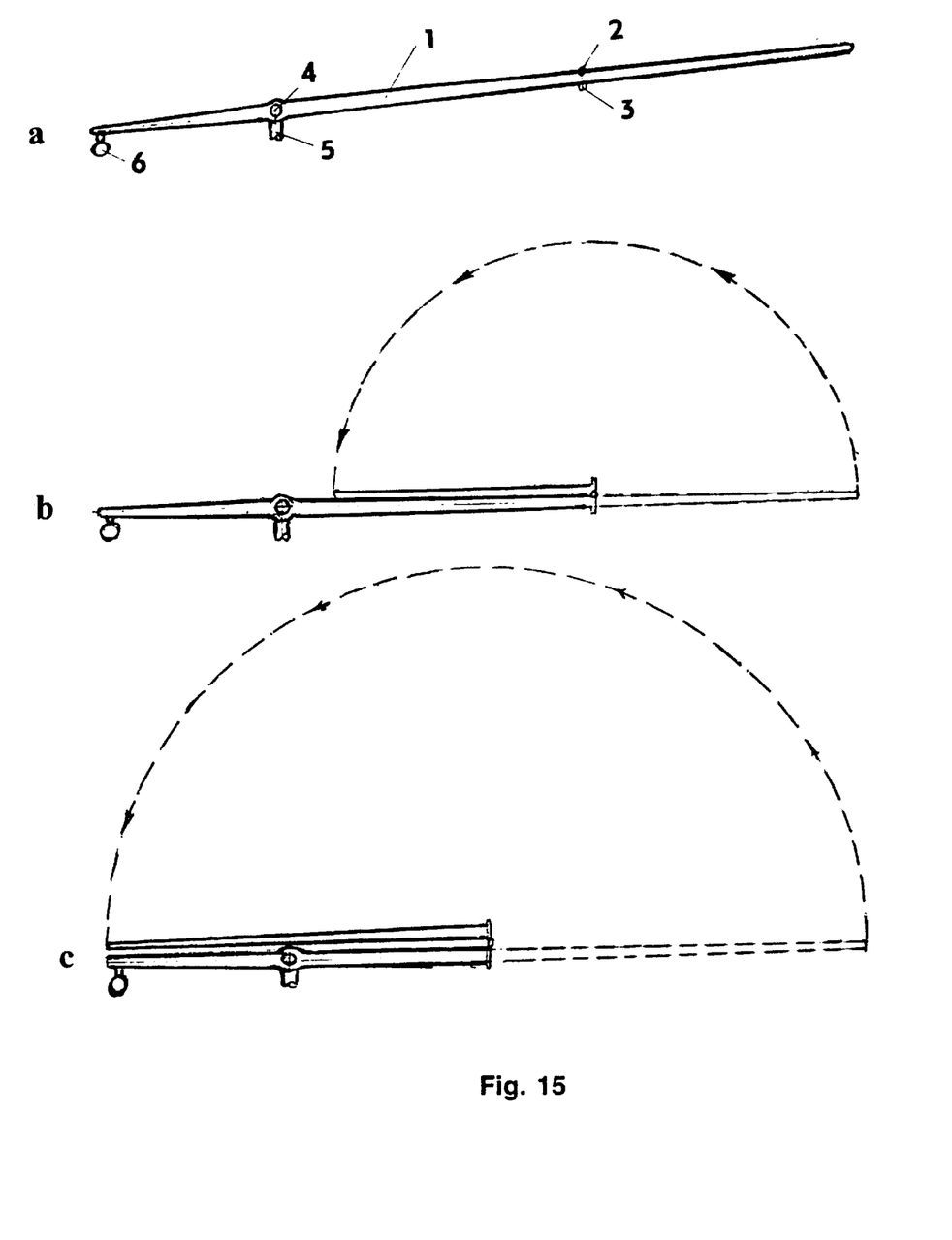
FIG. 15. Mechanism of folding for uniblade.

The uniblade can be make of folding (FIG. 15). That can have hinge 2 and lock 3. The folding may used on flying car, motorcycle, holycopter, covercraft and military VTOL airplanes and helicopters.

As you see on FIG. 15c the size of aircraft may be decreased more than two times, and request area for storage in 4 times.

Figure 5:
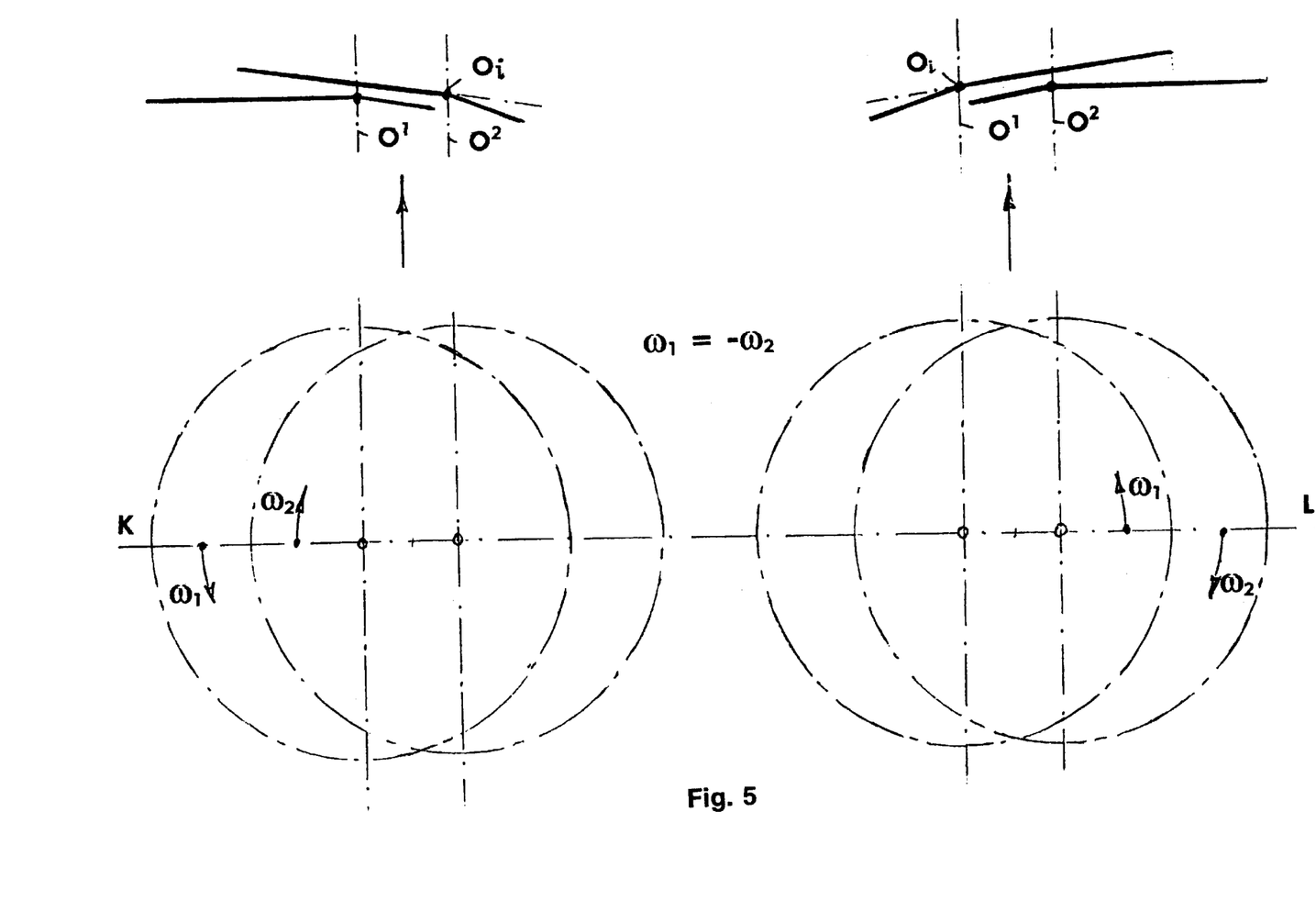
FIG. 5. Sketch of the synchronously rotating uniblades rotors rotated in opposed directions, which have different axis. Meeting line KL is located in perpendicular direction of flight. The such uniblade rotors provide small distance between the rotors.

In case of a coupled rotor, thanks to only one blade in the uniblade rotor, distance between axles of the two uniblade rotors can be made smaller than in multiblade variant. In this case the meeting line KL (of the synchronously rotating rotors) is perpendicular to flight direction (FIG. 5).

Figure 6:
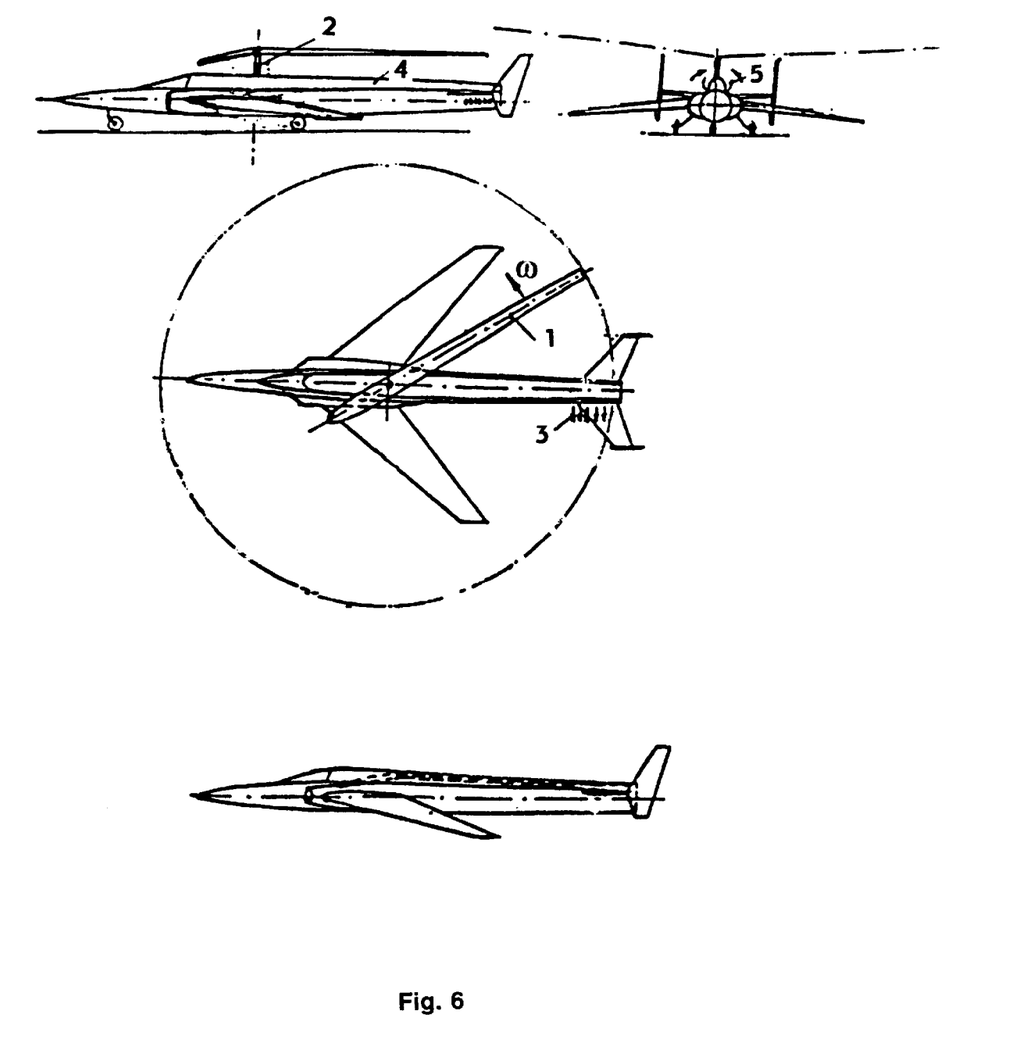
FIG. 6 Supersonic helicopter—airplane (supersonic VTOL Fighter) with uniblade retracted rotor. a) 1—single-blade propeller; 2—sliding stand; 3—jet streams from jet engines, equalizing the reaction of the propeller; 4—superstructure for retracting the propeller; 5—hatches.
Figure 7:
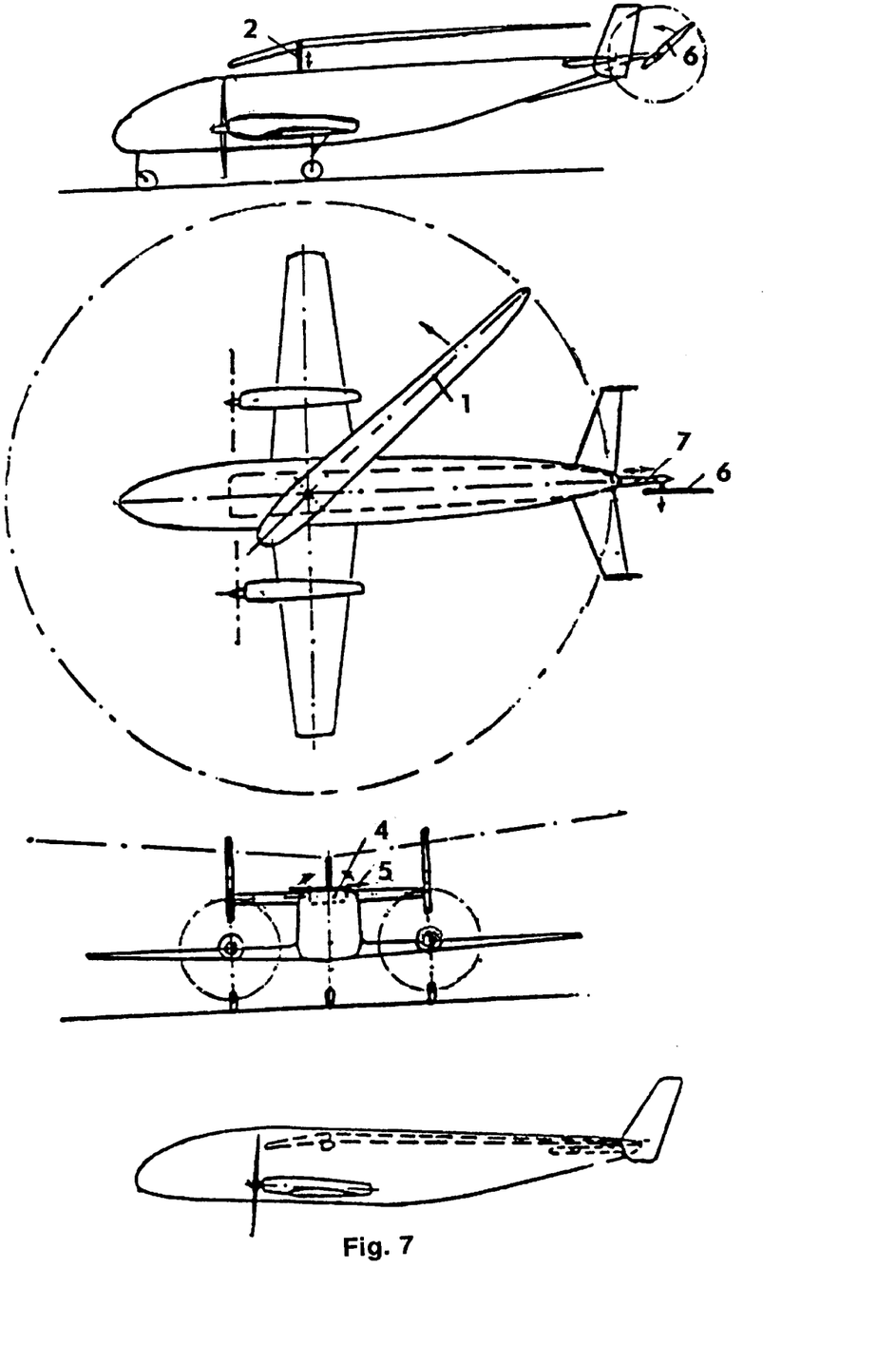
FIG. 7. a) Subsonic transport/passenger VTOL airplane with uniblade rotor.
Figure 8:
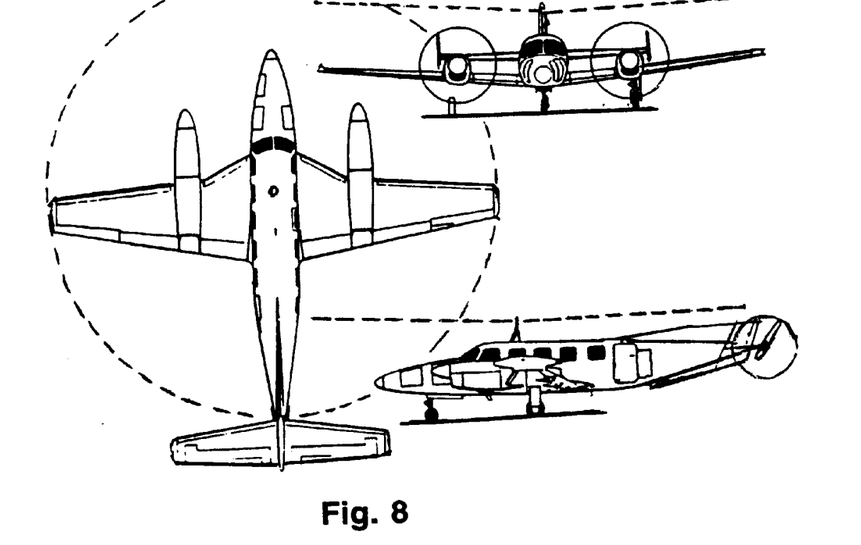
FIG. 8. Small subsonic passenger VTOL airplane with uniblade rotor.
Figure 9:
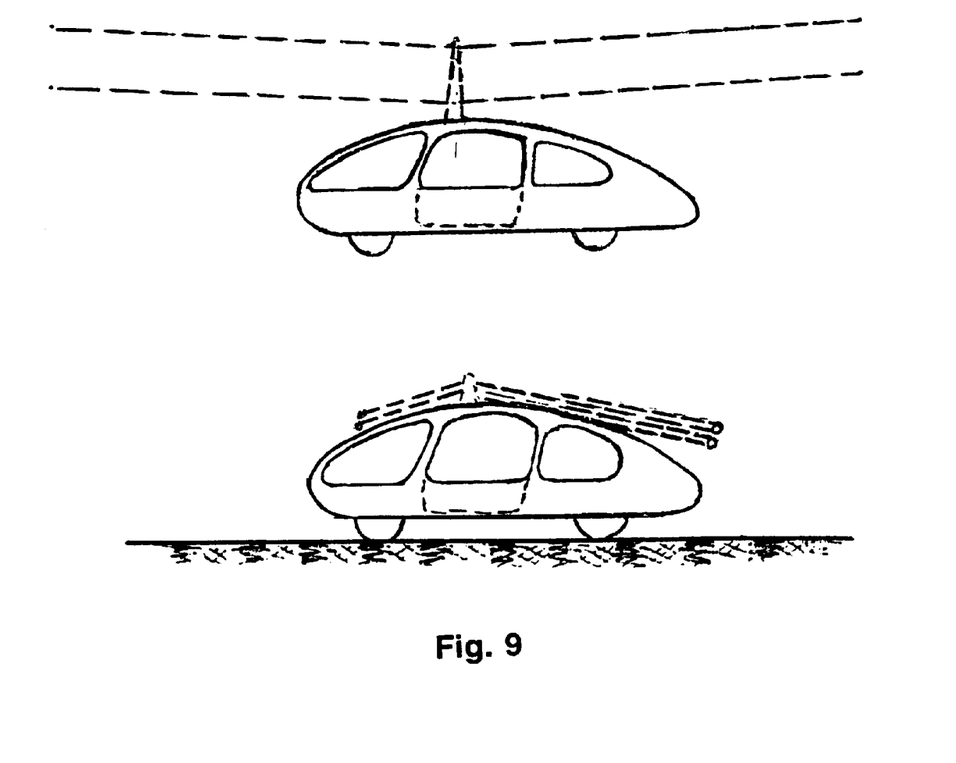
FIG. 9. Flight car with co-axes uniblade rotors.
Figure 10:
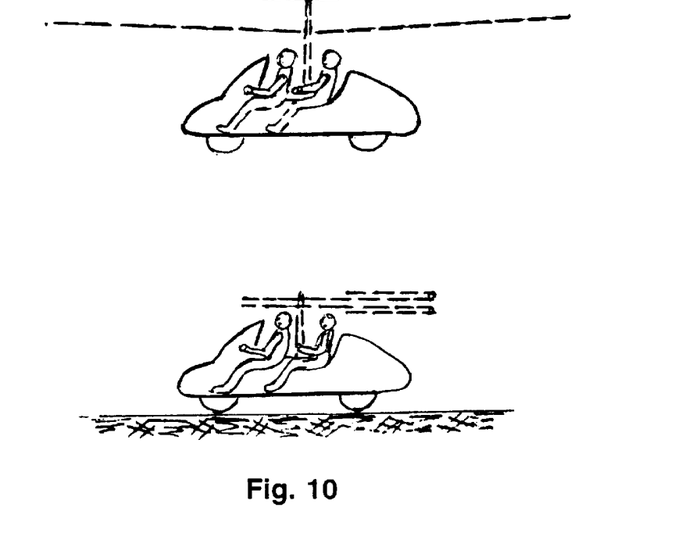
FIG. 10. Motorcycle with co-axle uniblade rotors.
Figure 11:
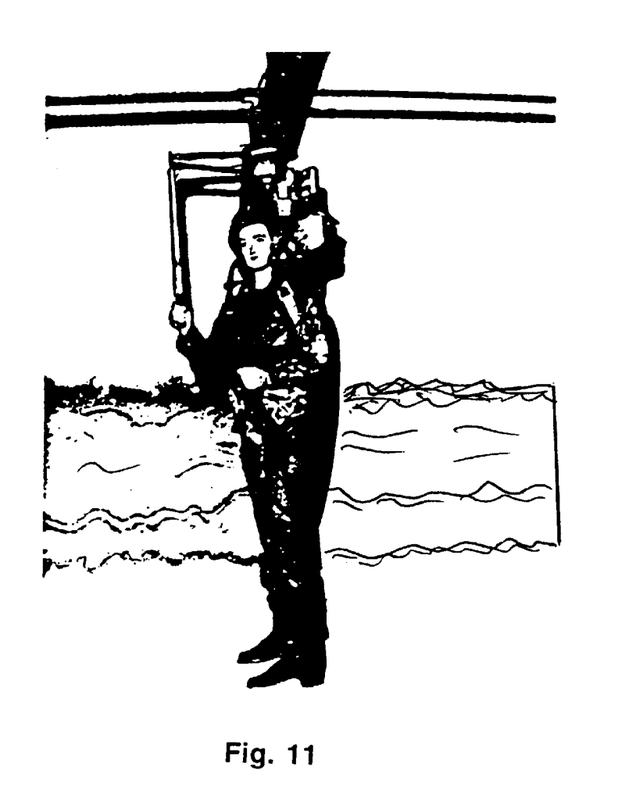
FIG. 11. Hoppycopter (knapsack helicopter) for young people, sportsmen, and soldiers with small co-axis uniblade rotors.
Figure 12:
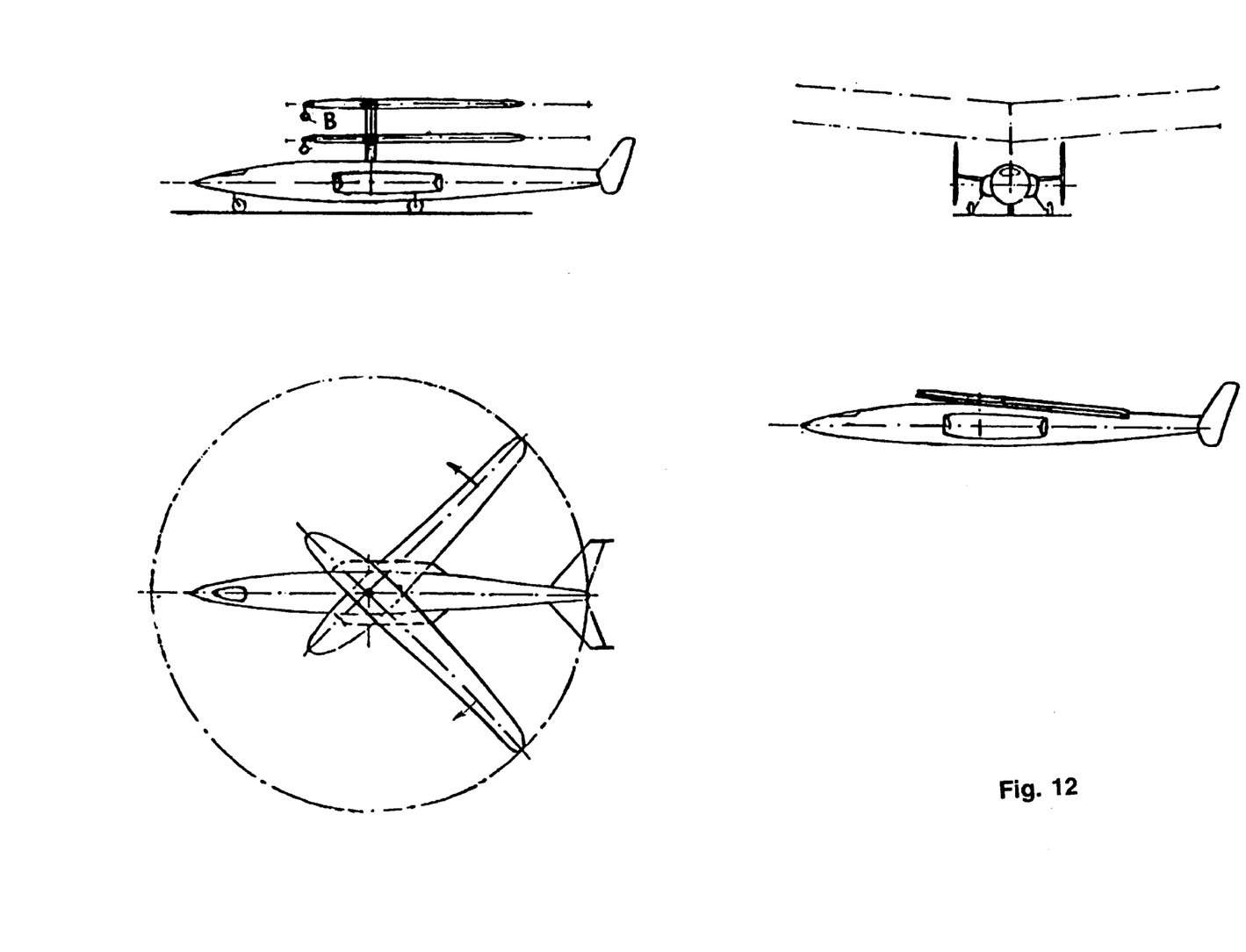
FIG. 12. a) Supersonic VTOL airplane with two co-axis uniblade rotors using in horizontal flight as variable swept wings. B—counter balance weight.

Various versions of the uniblade use are shown in FIGS. 6 to 13. FIG. 6 shows a supersonic fighter aircraft with the uniblade rotor. The rotors reaction here is balance by the gas jet of the aircraft. FIG. 7 shows the subsonic transport VTOL airplane having the uniblade rotor reaction of which is balanced by the single-blade tail propeller. FIG. 8 shows the small subsonic passenger VTOL airplane with uniblade rotor. FIG. 9 shows the flight car with co-axial uniblade rotors. One can be used as helicopter and as a car. FIG. 10 shows the flight motorcycle for young people. One can be used as a helicopter and as a motorcycle. FIG. 11 shows the small knapsack helicopter (hoppycopter) for young people, sportsmen, and soldiers with uniblades co-axial rotors. It can be put on shoulders of man and allow people to flay with maximum speed 50 mph (80 km/h), in ceiling of 12000 foot (4000 m), and range of 100 miles (160 km). FIG. 12 shows high speed vertical takeoff and landing airplane having co-axial rotors blades of which serve as variable geometry wings.

Figure 13:
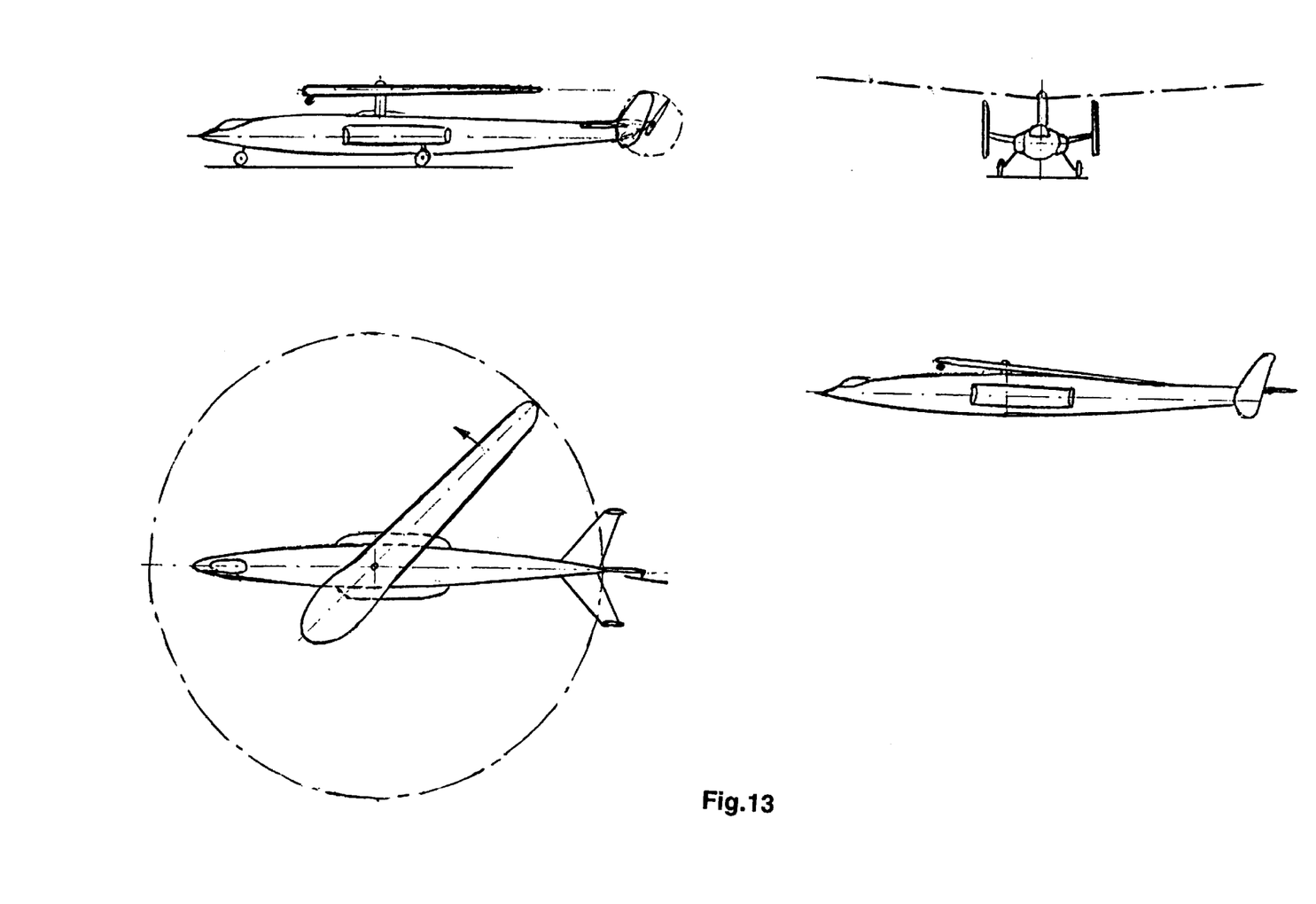
FIG. 13. a) Supersonic airplane with uniblade rotor using also as variable swept wing.

The blade of the uniblade rotor may have such a form of the widen part where the counterbalance is placed, that the resultant of lift force pressure and resistance is located at the vertical connecting axle. Thanks to this blade in the stopped position can work in flight as a high-speed variable swept wing (FIG. 13).

The uniblade rotor can have a mechanism for breaking, stopping, moving into the fuselage and moving out of the fuselage and rotating—all can be done in flight. Moreover, a mechanism for the rotor move-out operations can be made as either movable axle or as sliding axle of varying length. In removed state, the rotor does not create any drag and speed of the air vehicle can reach its designed value, including supersonic level. On landing, the rotor is moved out of the fuselage and starts rotating. It must be noted that this is possible only with a single-blade (uniblade) rotor. For rotors with 2, 3 or more blades, it is practically impossible to design in-flight rotor stopping and removal mechanism. The air stream would immediately destroy rotor, or topples a flight vehicle. Moreover, it is very difficult from a technical point of view, to move in and move out several blades.

Even with out hiding an uniblade rotor in flight, the single blade is positioned along the air stream and creates a little drag. Dimensional sizes of an flight vehicle with the uniblade rotor is less than sizes of a helicopter, and the apparatus can be quickly prepared for flight.

Result of the Patent Investigation

Patent are close to topics "Uniblade Air Rotor for Flight Vehicles"

Inventor: Alexander Bolonkin
USA
U.S. Pat. No. 5,074,753 Rotor blade
U.S. Pat. No. 4,434,956 Flexible helicopter rotor
U.S. Pat. No. 4,129,403 Helicopter rotors
U.S. Pat. No. 3,902,821 Helicopter rotors
U.S. Pat. No. 4,099,812 Helicopter rotors
U.S. Pat. No. 5,199,851 Helicopter rotor blades
U.S. Pat. No. 4,316,700 Helicopter rotor blades
U.S. Pat. No. 4,427,344 Helicopter rotor blade
U.S. Pat. No. 4,652,211
U.S. Pat. No. 4,588,356
U.S. Pat. No. 4,549,851
U.S. Pat. No. 4,540,340
U.S. Pat. No. 4,512,717
U.S. Pat. No. 5,320,494
U.S. Pat. No. 4,549,850
U.S. Pat. No. 4,543,040
U.S. Pat. No. 4,516,909
U.S. Pat. No. 4,509,898
U.S. Pat. No. 5,246,344
U.S. Pat. No. 5,205,851
U.S. Pat. No. 5,195,851
U.S. Pat. No. 5,174,721
U.S. Pat. No. 4,975,022
U.S. Pat. No. 4,808,075
U.S. Pat. No. 4,714,409
U.S. Pat. No. 4,668,169
U.S. Pat. No. 4,551,067
Russia, England, France, Germany, Japan:
None
A. Blekherman, Ph.D.

I claim:
1. An uniblade air rotor for flight vehicle, comprising:
a single horizontal blade rotatable about a main vertical axis of rotation and having a longitudinal axis;
said single horizontal blade having a swing axis which intersect with the main vertical axis of rotation of the rotor; and
a counterweight connected with said single horizontal blade on the opposite side of the axis of rotation from said single horizontal blade and located below the longitudinal axis of said single horizontal blade.

2. The rotor as recited in claim 1, comprising:
two co-axial said rotors with said uniblades which revolve synchronically in opposite directions;
in horizontal flight of vehicle a meeting line of said uniblades are located in the direction of flight.

3. The rotor as recited in claim 1, comprising:
two rotors with two uniblades, the interval between the vertical axles of uniblades may be less than rotor diameter;
said uniblades revolve synchronically in opposite directions;
in horizontal motion of vehicle a meeting line of said uniblades are located perpendicular to flight direction.

4. The rotor as recited in claim 1, comprising:
said counterweight part of uniblade is profiled such that in stopped position said uniblade can work as a variable sweep wing.

5. The rotor as recited in claim 1, further includes:
engine and mechanisms located in said vehicle for braking, stopping blade rotation, retraction of blade into fuselage, gondola of said vehicle, extraction of blade from fuselage, gondola, and running of said uniblade rotor for landing of said vehicle.

6. The rotor as recited in claim 5, comprising;
said mechanism of retraction design as a slip axle with variable length.

7. The rotor as recited in claim 5, located on flying vehicle and comprising:
pockets located in fuselage, gondola of said vehicle for retraction of said blades;
hatches connected with said fuselage which close said pockets in flight of vehicle.

8. The rotor as recited in claim 1, further including:
an additional turning blade at the end of said uniblade;
a sensor measuring distance to ground located at said additional blade;
mechanism for rotation of said additional blade.

9. A flying vehicle comprising:
uniblade rotor system including: a single horizontal blade rotatable about a main vertical axis of rotation and having a longitudinal axis, said single horizontal blade having a swing axis which intersect with the main vertical axis of rotation of the rotor, and a counterweight connected with said single horizontal blade on the opposite side of the axis of rotation from said single horizontal blade and located below the longitudinal axis of said single horizontal blade;
mechanisms located on said vehicle for braking, stopping blade rotation, retraction of blade into fuselage, gondola of said vehicle, extraction of blade from fuselage, gondola, and running of said uniblade rotor for landing of said vehicle.

10. The flying vehicle as recited in claim 9, further including:
a hinge located on said main blades for folding of main blades for decreasing of the rotor diameter in a storage.

11. A flying vehicle, including hovercraft, comprising:
a rotor system having a main horizontal blades for providing lift to said vehicle;
said rotor system having a vertical turning blade at the end of said horizontal blade and extending below the horizontal axis of said horizontal blades;
a sensors located on said turning blades for measuring the distance to the ground; and
a mechanism for turning said turning blade relative to said main horizontal blades.

* * * * *